US008738456B2

(12) United States Patent
Sembower

(10) Patent No.: US 8,738,456 B2
(45) Date of Patent: May 27, 2014

(54) ELECTRONIC SHOPPER CATALOG

(75) Inventor: Neil Robert Sembower, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1080 days.

(21) Appl. No.: 11/559,704

(22) Filed: Nov. 14, 2006

(65) Prior Publication Data
US 2008/0114807 A1 May 15, 2008

(51) Int. Cl.
*G06Q 30/00* (2012.01)
*G06Q 30/06* (2012.01)

(52) U.S. Cl.
CPC .................................. *G06Q 30/0601* (2013.01)
USPC ........................................................ 705/26.1

(58) Field of Classification Search
USPC .............. 705/26, 27, 26.1, 26.2, 26.25, 26.3, 705/26.35, 26.4, 26.41–26.44, 26.5, 705/26.61–26.64, 26.7, 26.8, 26.81, 26.82, 705/26.9, 27.1, 27.2
See application file for complete search history.

(56) References Cited

U.S. PATENT DOCUMENTS

| | | | |
|---|---|---|---|
| 5,231,566 A | 7/1993 | Blutinger et al. | |
| 5,446,653 A | 8/1995 | Miller et al. | |
| 5,465,213 A | 11/1995 | Ross | |
| 5,740,425 A | 4/1998 | Povilus | |
| 5,819,226 A * | 10/1998 | Gopinathan et al. | 705/44 |
| 6,173,286 B1 | 1/2001 | Guttman et al. | |
| 6,182,095 B1 | 1/2001 | Leymaster et al. | |
| 6,189,019 B1 | 2/2001 | Blumer et al. | |
| 6,192,381 B1 | 2/2001 | Stiegemeier et al. | |
| 6,317,650 B1 | 11/2001 | Powell et al. | |
| 6,356,903 B1 | 3/2002 | Baxter et al. | |
| 6,366,918 B1 | 4/2002 | Guttman et al. | |
| 6,578,030 B1 | 6/2003 | Wilmsen et al. | |
| 6,611,840 B1 | 8/2003 | Baer et al. | |
| 6,678,695 B1 * | 1/2004 | Bonneau et al. | 707/102 |
| 6,868,392 B1 * | 3/2005 | Ogasawara | 705/7.25 |
| 6,898,601 B2 | 5/2005 | Amado et al. | |
| 6,901,408 B2 | 5/2005 | Fachat et al. | |
| 6,978,273 B1 * | 12/2005 | Bonneau et al. | 707/102 |
| 6,981,214 B1 | 12/2005 | Miller et al. | |
| 7,024,022 B2 | 4/2006 | Harrington et al. | |
| 7,047,490 B1 | 5/2006 | Markovic et al. | |
| 7,092,552 B2 | 8/2006 | Harrington et al. | |
| 7,103,605 B1 | 9/2006 | Hazi et al. | |
| 7,107,221 B1 | 9/2006 | Tracy et al. | |

(Continued)

OTHER PUBLICATIONS

Nancy Blachman and Jerry Peek, "How Google Works—Google Guide", Feb. 2, 2007. Retrieved from http://www.googleguide.com/google_works.html.*

(Continued)

*Primary Examiner* — Naeem Haq
(74) *Attorney, Agent, or Firm* — Fox Rothschild LLP

(57) ABSTRACT

A method of creating a custom document comprises maintaining a database of product information, the product information including, for each of multiple products, a product description, vendor information and at least one vendor specific attribute wherein at least one product from the database includes multiple vendors. At least one product from the database is identified based on customer product preference information that is associated with a customer. For an identified product having multiple vendors, a vendor from the product's associated vendors is selected using customer vendor preference information that is associated with the customer. A custom structured document is created that includes the selected product, product description, and one or more vendor specific attributes for the selected vendor.

19 Claims, 2 Drawing Sheets

(56) References Cited

U.S. PATENT DOCUMENTS

| | | |
|---|---|---|
| 7,107,525 B2 | 9/2006 | Purvis |
| 7,124,096 B2* | 10/2006 | Dutta et al. ............... 705/26.61 |
| 7,171,617 B2 | 1/2007 | Harrington et al. |
| 7,171,618 B2 | 1/2007 | Harrington et al. |
| 7,171,620 B2 | 1/2007 | Castellani et al. |
| 7,305,616 B1 | 12/2007 | Nelson et al. |
| 7,552,069 B2 | 6/2009 | Kepecs |
| 2002/0046235 A1 | 4/2002 | Foy et al. |
| 2002/0052801 A1* | 5/2002 | Norton et al. .................... 705/26 |
| 2002/0078083 A1 | 6/2002 | Armstrong |
| 2002/0178025 A1 | 11/2002 | Hansen et al. |
| 2002/0194081 A1 | 12/2002 | Perkowski |
| 2003/0036960 A1* | 2/2003 | Suzaki et al. .................... 705/14 |
| 2003/0043405 A1 | 3/2003 | Hill |
| 2003/0093331 A1* | 5/2003 | Childs et al. .................... 705/26 |
| 2003/0128229 A1 | 7/2003 | Colson et al. |
| 2003/0139979 A1* | 7/2003 | Moore ............................. 705/27 |
| 2003/0169451 A1 | 9/2003 | Ponce |
| 2003/0172354 A1 | 9/2003 | Martinez Ponce |
| 2004/0019850 A1 | 1/2004 | Purvis et al. |
| 2004/0117732 A1 | 6/2004 | McNeill et al. |
| 2004/0122831 A1 | 6/2004 | Ha et al. |
| 2004/0133542 A1* | 7/2004 | Doerksen et al. .................. 707/1 |
| 2004/0205645 A1 | 10/2004 | Hoffman |
| 2004/0205656 A1 | 10/2004 | Reulein et al. |
| 2005/0038668 A1 | 2/2005 | Singh et al. |
| 2005/0040230 A1 | 2/2005 | Swartz et al. |
| 2005/0050442 A1 | 3/2005 | Pope et al. |
| 2005/0129423 A1 | 6/2005 | Lester et al. |
| 2005/0159974 A1* | 7/2005 | Moss et al. ......................... 705/1 |
| 2005/0160070 A1 | 7/2005 | Mashni et al. |
| 2005/0169558 A1 | 8/2005 | Dance et al. |
| 2005/0216357 A1 | 9/2005 | Wittmer et al. |
| 2005/0223319 A1 | 10/2005 | Ohashi et al. |
| 2005/0234771 A1 | 10/2005 | Register et al. |
| 2005/0254885 A1 | 11/2005 | Laufer |
| 2005/0267804 A1 | 12/2005 | Lonsbury et al. |
| 2005/0283410 A1* | 12/2005 | Gosko ............................. 705/27 |
| 2006/0048042 A1 | 3/2006 | Sembower et al. |
| 2006/0048053 A1 | 3/2006 | Sembower et al. |
| 2006/0111928 A1* | 5/2006 | Fisher et al. ....................... 705/1 |
| 2006/0178917 A1 | 8/2006 | Merriam et al. |
| 2006/0190331 A1 | 8/2006 | Tollinger et al. |
| 2007/0005580 A1 | 1/2007 | Rinearson et al. |
| 2007/0011607 A1 | 1/2007 | Lazareck et al. |
| 2007/0038931 A1 | 2/2007 | Allaire et al. |
| 2007/0101259 A1 | 5/2007 | Grigoriadis et al. |
| 2007/0130509 A1 | 6/2007 | Gombert et al. |
| 2007/0260671 A1 | 11/2007 | Harinstein et al. |
| 2008/0028300 A1 | 1/2008 | Krieger et al. |
| 2008/0103885 A1 | 5/2008 | Hashim et al. |
| 2008/0275755 A1* | 11/2008 | Brustein et al. .................. 705/10 |
| 2009/0241015 A1 | 9/2009 | Bender et al. |

OTHER PUBLICATIONS http://s7ondernand1.scene7.com/s7ondermand/brochure/flash__brochure.jsp?company=eBay . . . ; Fall's Top 5 Trends; printed Sep. 19, 2006: p. 1.

http://pages.ebay.com/catalog/; eBay Fall Catalog, printed Sep. 19, 2006: pp. 2.

http://www.scienceblog.com/community/older/2003/E/20032932.html; Wireless PDA Software Helps Grocery Shoppers Find Items; Apr. 2003; from Georgia Insitute of Technology Research News; 5 pages.

www.bigmachines.com/proposal__generator.php, Big Machines, printed Apr. 17, 2008.

www.business-integrity.com/document-assembly.html. Business Integrity, printed Apr. 17, 2008.

http://realfast.com, Realfast, printed Apr. 17, 2008.

\* cited by examiner

ELECTRONIC SHOPPER CATALOG

BACKGROUND

Description of the Related Art

Paper catalogs allow customers to view many items on a single page. One can view a paper catalog by casually flipping from page to page in the comfort of an arm chair inside a house or in a doctor's office waiting room. Paper catalogs can be the product of one particular vendor or a catalog can contain multiple vendors. In a paper catalog, it is easy for a consumer to browse the catalog and view unrelated items.

Electronic catalogs, such as catalogs on a computer, cell phone, television, portable media player, or personal digital assistant, allow customers to view items of interest on an electronic display for potential purchase. Online purchasing systems such as commercial auction sites and online shopping malls are generally segmented by product and contain multiple vendors selling the same product. The vendors may try to compete, but often their high seller reviews, free packaging or gift-wrapping services are overlooked in favor of a larger competitor with a more well-known name. The nature of all online catalog makes it difficult for customers to easily browse between different types of products without beginning a new search. Patents such as U.S. Pat. Nos. 5,231,566 and 6,901,408, the disclosures of which are incorporated herein by reference in their entirety, discuss examples of electronic catalog structures.

To make online catalogs easier for the consumer, the catalog can be personalized using, customer information. These online catalogs select what the viewer sees on the display. In order for one to view their personalized catalog, the customer must be using the electronic display device. Thus, there is no printed catalog that is personalized to a specified consumer.

Some online catalog companies create standard catalogs that can be printed, but the items must be ordered online and the printed catalogs are not tailored for any particular user. These printed catalogs function as a brochure to allow one to see a taste of what they can order online. Thus, the purpose of the printed catalog is to encourage the consumer to browse and buy from the online catalog.

U.S. Pat. No. 6,704,773, the disclosure of which is incorporated herein by reference in its entirety, discusses a method of using digital rights management to generate an electronic book. While it is possible to create a book, pamphlet, or booklet from information in a database, there is not currently a way to make printed catalogs for a specific customer.

The disclosure contained herein describes methods of resolving one or more of the problems discussed above.

SUMMARY

In one embodiment, a method of creating a custom document includes maintaining a database of product information, the product information including, for each of multiple products, a product description, vendor information and at least one vendor specific attribute wherein at least one product from the database includes multiple vendors. At least one product from the database may be identified based on customer product preference information that is associated with a customer. For an identified product having multiple vendors, a vendor from the product's associated vendors may be selected using customer vendor preference information that is associated with the customer. A custom structured document may be created that includes the selected product, product description, and one or more vendor specific attributes for the selected vendor.

The custom structured document may be printed to produce a customized product catalog. The customer product preference information may be based on the customer's previous shopping patterns. Alternatively, the customer product preference information may be received from the customer. In another embodiment, the customer product preference information may be based on the customer's demographic information. The customer vendor preference information may include a preference for one or more of product cost, shipping cost, delivery time, delivery handler, insurance cost, extended warranties, and vendor reliability. In an embodiment, the vendor specific attributes do not include the vendor's name. Vendor product information may, in some embodiments, be obtained from the vendor's website. In all embodiment, a database of customer product preference information may be maintained. Optionally, the customer product preference information in the database may be updated when customer purchases a new product. In addition, a database of customer vendor preference information may be maintained. The customer vendor preference information may be updated when a customer purchases a new product. Optionally, at least one product from the database contains multiple vendors.

In one embodiment, the creation of the custom structured document may include determining a layout for the custom structured document. In one embodiment, the layout groups the products may be by price. Alternatively, the layout may be grouped the products by category. In one embodiment the custom structured document may include creating a default layout for the custom structured document.

In one embodiment, a method of creating a custom document may include maintaining a database of product information, the product information including, for each of multiple products, a product description, vendor information and at least one vendor specific attribute wherein at least one product from the database includes multiple vendors. At least one product from the database listed in a standard set may be identified. At least one product from the database for a custom set based on customer product preference information may be identified. For an identified product having multiple vendors from the custom set, a vendor from the product's associated vendors may be selected using customer vendor preference information. A custom structured document may be printed that includes the identified products and product descriptions from the standard set; and the selected product, product description, and one or more vendor specific attributes for the selected vendor from the custom set. In one embodiment, printing the custom structured document may include determining a layout for the custom structured document. Alternatively, printing the custom structured document may include creating a default layout for the custom structured document.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
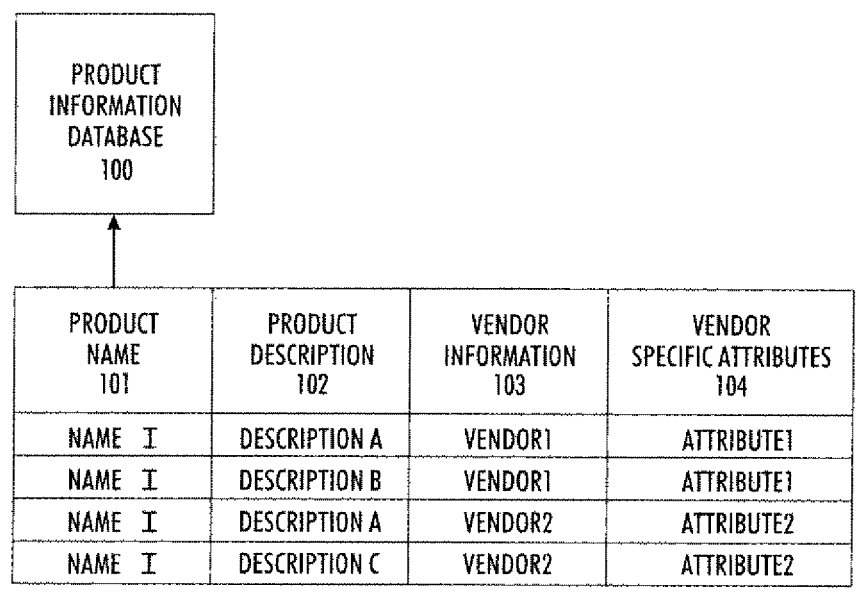
FIG. 1 depicts exemplary elements of a product information database.

In one embodiment, a custom structured document may be created using a product information database. A custom structured document may be multiple pages which are bound together containing products offered for sale in one embodiment, a custom structured document may be a catalog. As illustrated in FIG. 1, the product information database 100 may contain a product name 101, product description 102, vendor information 103, and one or more vendor specific attributes 104 for each product. The database contains at least one product that has more than one vendor. Therefore, for at least some of the products in the database, there will be multiple vendors selling the same product.

The product information database 100 nay be one database or it may be multiple interconnected databases. The product name 101 may be the name or other descriptive identifier of the good being sold. The product description 102 may be detailed information about the product offered for sale. In one embodiment, the product description 102 may be a simple description of the product explaining its use or purpose. In another embodiment, a product description 102 may include a picture of the product. In yet another embodiment, a product description 102 may include details about the product such as, but not limited to, color, dimensions or size, material, manufacturer, UPC code or other alphanumeric identifier, and operating instructions. Vendor information 103 may contain details about the vendor or vendors who are willing to supply each product. Vendor information 103 may include, but is not limited to, for each product, the vendor's name, vendor code, vendor description, and location of the vendor. A vendor specific attribute 104 may be additional information about the vendor's services. Vendor specific attributes 104 may include, but are not limited to, price shipping cost, packaging, gift wrap cost, delivery time, delivery handler, insurance cost, used product information, and vendor reliability ratings.

For example, the database may contain more than one product named "11 inch youth baseball glove." The product name 101 may be "11 inch youth baseball glove." In one embodiment, for each "11 inch youth baseball glove" in the database, the product description 102 may include the manufacturer, the color of the glove, and a picture. In a further embodiment, one vendor may sell multiple "11 inch youth baseball gloves" by different manufacturers such as Rawlings, Mizuno, and Nike. The product information database 100 may contain a separate entry for each product name 101 and the associated product description 102 which may include the manufacturer. Alternatively, the product name 101 can just be "glove" and the product description 102 can include, but is not limited to, the type of glove, size of the glove, and manufacturer. The vendor information 103 may include the name of the vendor. Alternatively, vendor information 103 may include information about the vendor such as the store locations. The vendor specific attributes 104 may be associated with each entry in the database. For example, the products sold by one vendor may have the vendor specific attributes of shipment by overnight delivery and free gift wrap services.

Figure 2:
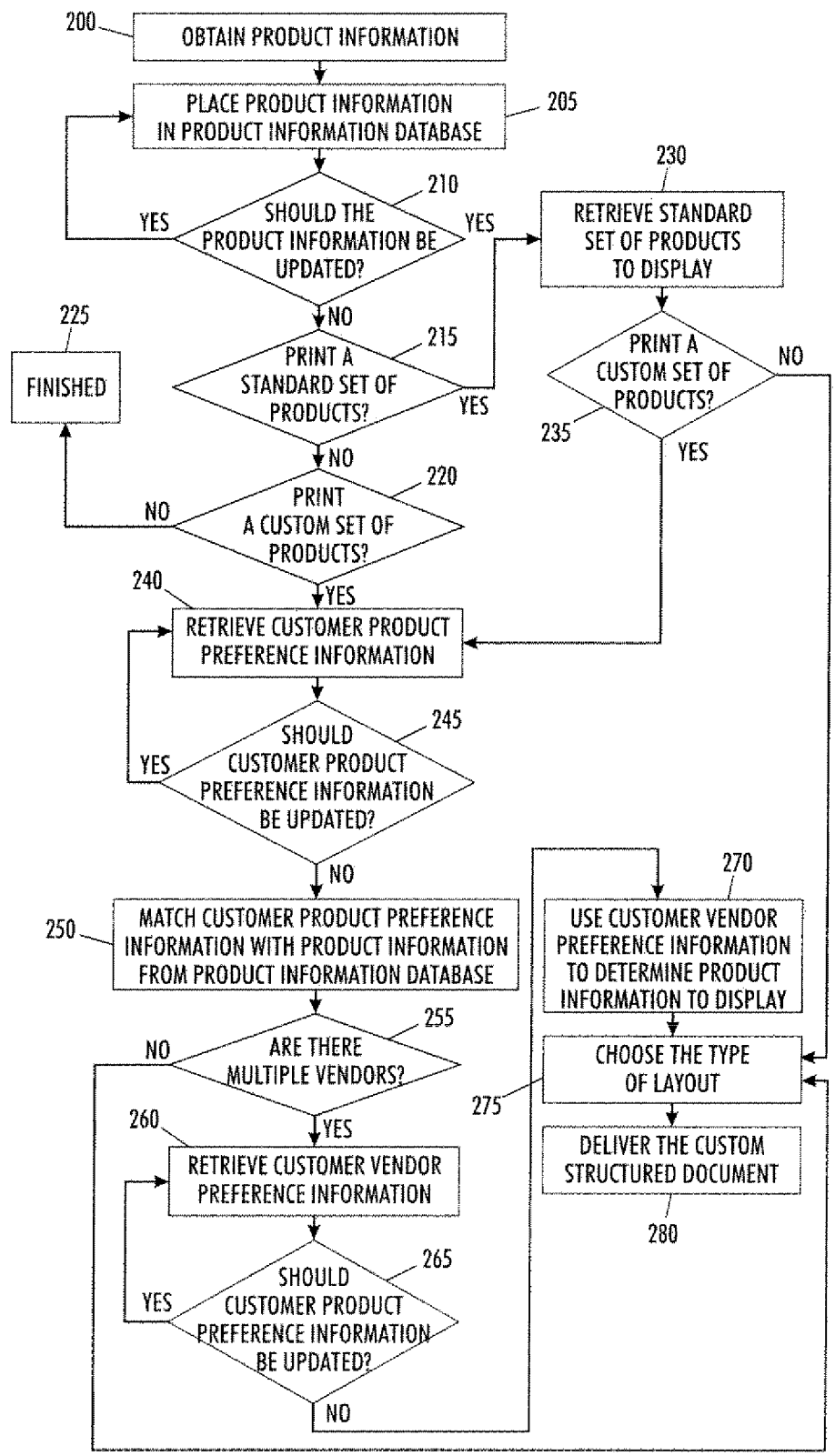
FIG. 2 depicts a flow diagram of an exemplary method of creating a custom structured document.

FIG. 2 depicts a flow diagram of an exemplary method of creating a custom structured document. Product information for the product information database may be obtained in a variety of ways 200. In one embodiment, the product information may be given in paper form. In another embodiment, the product information may be given in electronic form by a spreadsheet, database, or other electronic form. In a third embodiment the product information may be obtained by web crawling and extracting vendor product information either at the vendor's sites or other websites. The obtained product information can then be placed in the product information database 205.

The system may determine that the product information in the database should be updated 210. In one embodiments the product information may be manually updated whenever the vendor supplies new information. In another embodiment, the product information in the database may be updated electronically or by manual data entry. Optionally, the database may be automatically or continuously updated whenever the vendor receives a new shipment or sells new supplies. Yet, in other embodiments, the information in the database may be updated after a specified period of time, or the database may be updated on a random or inconsistent time schedule.

In one embodiment, the system may determine whether to print a standard set of products in the custom structured document 215. The standard set of products may be products listed in the database that a vendor wants to have placed in a custom structured document. These products may be placed in the custom structured document regardless of customer product preferences. If the system does not include the standard set of products, then the system can determine if a custom set of products will be printed 220. If neither a standard set of products nor a custom set of products are retrieved, then the system is finished as there are no products to print in the custom structured document 225.

However, if the system determines that a standard set of products may be printed in the custom structured document, the standard set of the products is retrieved 230. After the standard set of products is retrieved 230, the systems may determine if a custom set of products may be printed 235. If a custom set of products is not printed, then the system may choose the type of layout 275 for printing the standard set of products in the custom structured document. Additionally, even if a standard set of products is chosen 215, the system may also decide to print a custom set of products 235 in the custom structured document.

If the system decides to print a custom set of products, the system may retrieve the customer product preference information 240. Customer product preference information may be data indicative of consumer wants, desires and/or preferences toward various products. In one embodiment, customer product preference information may be obtained when the customer requests a catalog in manual or electronic form. In another embodiment, customer product preference information may be obtained when the customer logs onto the product information database. In one embodiment, customers may explicitly specify their preferences. The customer may opt to have specific information, that the customer is interested in receiving, inside the custom structured document. In another embodiment, the customer product preference information may be determined by past customer behavior. This may include, but is not limited to, past purchasing, previous shopping patterns, vocation or profession, affiliations with religious and civic organizations, past club membership(s), and spending habits. In yet another embodiment, customer product preference information may be determined by demographic information. Demographic information may include, but is not limited to, geographic location, sex, race, ethnicity, age, marital status, education and income level.

The customer product preference information may be stored in a database. In one embodiment, the customer product preference information may be stored in a single database. In another embodiment, the information is stored in multiple databases. Alternatively, the customer product preference information may be stored in the product information database or in a separate database.

The system may decide to update the customer product preference information 245. In one embodiment, the information can be updated by a customer requesting new information either electronically or manually. In another embodiment, the customer product preference information may be updated when the customer makes a purchase. Alternatively, the customer product preference information may be automatically updated whenever the customer electronically purchases new products. In other embodiments, the customer product preference information may be updated after a specified period of time, or it may be updated on a random or inconsistent time schedule. Alternatively, the customer product preference information may be updated when there is a change in the customer's demographics.

The system may create a custom set of products by matching the customer product preference information with the products inside the product information database 250. After creating the custom set of products, the system may determine if there are multiple vendors selling the same product 255. In one embodiment, the system can determine if multiple vendors are selling the same products by comparing the product's name. In another embodiments the system uses the product name and product description to make a comparison.

If there are not multiple vendors selling the same product, then the system will decide what layout to use to structure the custom structured document 275. However if there are multiple vendors, the customer vendor preference information may be retrieved 260. Customer vendor preference information contains one or more tendencies of a customer that indicate which vendor to select when multiple vendors list the same product in the product information database. Customer vendor preference information may include, but is not limited to, price, warranty, shipping costs, gift wrapping, shipping company, bundling goods, and delivery options. For example, the customer vendor preference information may be that the customer prefers that the product be delivered by DHL. Therefore, when a product is being sold by two or more vendors, the customer vendor preference information may choose to place in the custom structured document the product from the vendor who uses DHL for delivery.

In one embodiment, the customer vendor preference information may be received directly from the customer in either paper or electronic form. In another embodiment, customer vendor preference information may be obtained by compiling the customer's previous shopping patterns or previous spending habits. In a third embodiment, customer vendor preference information may be defaulted to lowest price. In yet another embodiment, the customer vendor preference information may contain some of the customer's previous behavior information and some default information to determine what products to display on the custom structured document.

The customer vendor preference information may be stored in a database. In one embodiment, the information is stored in one database. In another embodiment, the customer vendor preference information is stored in multiple databases. Alternatively, the customer vendor preference information may be stored in the product information database, customer product preference database, or separately.

Customer vendor preference information may be updated 265. In one embodiment, the customer vendor preference information may be manually updated. In another embodiment, the customer vendor preference information may be updated continuously. In one embodiment, the customer vendor preference information may be updated when the customer makes a new purchase. Alternatively, the customer vendor preference information may be automatically updated whenever the customer electronically purchases a new product. In other embodiments, the customer vendor preference information may be updated after a specified period of time, or it may be updated on a random or inconsistent time schedule.

The customer vendor preference information may be used to determine which vendor's product may be included in the custom structured document 270. In one example, the customer product preference information may contain information about electronic products. When matching the electronic products of the customer product preference information with the product information from the product information database 250, often multiple vendors are selling the same electronics product 255. In a further example, many different vendors in the product information database, such as Circuit City and Best Buy, sell a 32 inch flat panel television. When the customer product preference information is matched with the product information in the product information database 250, the system will identify all the vendors selling the 32 inch flat panel screen television. The system can look to the customer vendor preference information to determine which vendor's product to select 270. In the previous example, if the customer wanted DHL delivery, then a vendor that uses DHL delivery would be chosen instead of a vendor who only uses FedEx. Therefore, if Circuit City used DHL, but Best Buy used FedEx, then a product from Circuit City would be chosen.

Once the products are selected from the various vendors, a custom structured document may be created by choosing a layout 275. In one embodiment, there may be a standard layout. In another embodiment, the layout may be based on the amount of products to be placed in a custom structured document. For example, if many products were retrieved by the standard set and/or many products were retrieved in the custom set, the layout may contain many products on a single page. Alternatively, if fewer products were retrieved, the layout may contain fewer products on a page. In yet another embodiment, the layout may be chosen based upon a set of rules which may include, but are not limited to, placing standard products before requested products or grouping products by price and placing higher priced items before lower priced items. In another embodiment, the layout may group the products by category or other characteristics of the chosen products.

In one embodiment, the custom structured document layout may include the name of each selected product, product description, and vendor specific attributes. In another embodiment, the vendor's name may not be displayed on the custom structured document layout. In yet another embodiment, only the product name and product description may be displayed on the custom structured document layout.

After the custom structured document layout is created, the document may be delivered to the customer 280. In one embodiment, the document may be delivered to the customer via e-mail. In another embodiment, the document may be printed. In yet another embodiment, the document may be printed and mailed to the customer's home or work address. Alternatively, the document may be printed to a central location where the customer can retrieve it.

It will be appreciated that various of the above-disclosed and other features and functions, or alternatives thereof may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of creating a custom document, the method comprising:
    maintaining, at a computing device, a database of product information, the product information including, for each of multiple products, a product description, vendor information and at least one vendor specific attribute defining additional services provided by each vendor included in the vendor information, wherein at least one product from the database includes multiple vendors;
    identifying, by the computing device, at least one product for sale from a specific manufacturer from the database based on customer product preference information that is associated with a customer, wherein the customer product preference information is based, at least in part, on a purchase history of the customer;
    determining, by the computing device, whether the identified product is offered by multiple vendors;
    selecting, by the computing device, for an identified product determined to have multiple vendors, a single vendor from the identified product's associated vendors using customer vendor preference information that is associated with the customer such that the single selected vendor provides additional services matching additional services defined by the customer vendor preference information, wherein the customer vendor preference information comprises:
        a preferred shipping company, and
        a preferred warranty associated with the identified product,
    wherein the additional services comprise:
        shipping the identified product using the preferred shipping company, and
        offering the preferred warranty for the identified product;
    creating, by the computing device, a customer structured document for delivery to the customer that includes, for the identified product, a product description and one or more vendor specific attributes for the single selected vendor based upon the product information and vendor information contained within the database; and
    in response to the customer purchasing the identified product, automatically updating the customer product preference information with information relating to the identified product.

2. The method of claim 1, further comprising printing the custom structured document to produce a customized product catalog.

3. The method of claim 1 further comprising, before the identifying, receiving the customer product preference information from the customer.

4. The method of claim 1 further comprising, before the identifying, determining the customer product preference information based on the customer's demographic information.

5. The method of claim 1 wherein the customer vendor preference information comprises a preference for one or more of product cost shipping cost, delivery time, insurance cost, extended warranties, and vendor reliability.

6. The method of claim 1 wherein the vendor specific attributes do not include the vendor's name.

7. The method of claim 1 further comprising obtaining the product information from the vendor's website.

8. The method of claim 1 further comprising maintaining a database of the customer product preference information.

9. The method of claim 8 further comprising updating the customer product preference information when a customer purchases a new product.

10. The method of claim 1 further comprising maintaining a database of the customer vendor preference information.

11. The method of claim 10 further comprising updating the customer vendor preference information when a customer purchases a new product.

12. The method of claim 1 further comprising associating at least one product from the database with multiple vendors.

13. The method of claim 1 wherein creating the custom structured document comprises determining a layout for the custom structured document.

14. The method of claim 13 wherein the layout groups the products by price.

15. The method of claim 13 wherein the layout groups the products by category.

16. The method of claim 1 wherein creating the custom structured document comprises creating a default layout for the custom structured document.

17. A method of creating a custom document, the method comprising:
    maintaining, at a computing device, a database of product information, the product information including, for each of multiple products, a product description, vendor information and at least one vendor specific attribute defining additional services provided by each vendor included in the vendor information, wherein at least one product from the database includes multiple vendors;
    identifying, by the computing device, at least one first product for sale from a specific manufacturer from the database listed in a standard set;
    identifying, by the computing device, at least one second product for sale from a specific manufacturer from the database for a custom set based on customer product preference information that is associated with a customer;
    determining, by the computing device, whether the identified second product is offered by multiple vendors;
    selecting, by the computing device, for an identified product determined to have multiple vendors from the customer set, a single vendor from the identified product's associated vendors using customer vendor preference information that is associated with the customer such that the single selected vendor provides additional services matching additional services defined by the customer vendor preference information,
    wherein the customer vendor preference information comprises:
        a preferred shipping company,
        a preferred shipping cost,
        one or more preferred delivery options, and
        a preferred warranty associated with the identified product,
    wherein the additional services comprise:
        shipping the identified product using the preferred shipping company, shipping the identified product for a cost that does not exceed the preferred shipping cost, shipping the identified product according to the one or more preferred delivery options, and offering the preferred warranty for the identified product; and printing a custom structured document for delivery to the customer that includes:

the identified products and product descriptions from the standard set based upon the product information within the database; and for the identified product from the custom set, a product description and one or more vendor specific attributes for the single selected vendor from the customer set based upon the vendor information contained within the database.

18. The method of claim 17 wherein printing the custom structured document comprises determining a layout for the custom structured document.

19. The method of claim 17 wherein printing the custom structured document comprises creating a default layout for the custom structured document.

\* \* \* \* \*